Patented Feb. 11, 1941

2,231,707

UNITED STATES PATENT OFFICE 2,231,707

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application October 31, 1939, Serial No. 302,206

10 Claims. (Cl. 260—206)

This invention relates to azo compounds and to fibrous organic derivatives of cellulose colored therewith. More particularly it relates to compounds having the general formula:

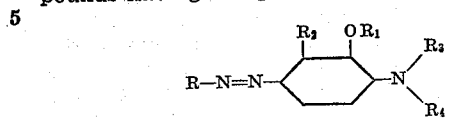

wherein R represents a member selected from the group consisting of a benzene nucleus, and a naphthalene nucleus, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group. The nucleus R may be substituted by one or more monovalent substituents selected from the group including atoms and groups such as chlorine, bromine, fluorine, methyl, ethyl, propyl, cetyl, methoxy, ethoxy, acetyl, carboxyl, carboxylic alkyl esters, nitro, and similar kind of substituents.

We are aware that heretofore it has been proposed to use cresidine coupling components in the preparation of azo compounds suitable for coloring cellulose esters. It might be supposed that the substitution of a structural isomer in place of cresidine would produce azo compounds differing not at all from those produced with the cresidine type. We have found, however, that by placing the substituent groups in an adjacent 1-amino-2-methoxy-3-alkylbenzene relationship, the new azo compounds obtained with these new coupling components result in colors which could not be accurately predicted from purely theoretical considerations. In addition to excellent fastness to light and atmospheric conditions, our new azo compounds form a series of brilliant tints which differ distinctly in shade from those obtainable with corresponding cresidines. For example, the azo compound obtained by diazotizing p-nitroaniline and coupling it with a 1-alkylamino-2-alkoxy-3-alkylbenzene colors textile materials a rich orange shade, whereas the azo compound obtained with p-nitroaniline and a corresponding alkylamino cresidine colors the same material a rubine shade.

It is an object of the invention, therefore, to prepare the class of azo compounds above described and to color organic derivatives of cellulose in the form of fibers, yarns, threads, and fabric materials therewith.

The azo compounds of our invention may be prepared by coupling the diazo salts of various suitable arylamines of the benzene, or naphthalene series with coupling components having the general formula:

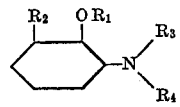

wherein $R_1$, $R_2$, $R_3$ and $R_4$ have the same meanings as previously defined. The intermediates represented by the above formula may be obtained by nitrating o-cresol, separating the 1-nitro-2-hydroxy-3-methylbenzene product and alkylating to the corresponding alkyl ether, followed by reduction of the nitro group to the amine, and finally the alkylation of the amino group to the desired intermediate.

The invention is illustrated by the following examples.

Example 1

1 mole of o-chloroaniline is dissolved in 2000 c. cs. of water containing 250 c. cs. of hydrochloric acid, ice added, and the amine diazotized with 69 grams of sodium nitrite. When diazotization is complete, the diazo solution is added with stirring to 1 mole of 2-methoxy-3-methyl-β-hydroxyethylaniline dissolved in a mixture of 2000 c. cs. of ice and water containing 100 c. cs. of hydrochloric acid. The mineral acid is slowly neutralized with sodium bicarbonate, after which the dye is filtered off, washed and dried. Cellulose acetate is colored yellow shades from an aqueous suspension of the dye.

The azo compound obtained has the formula:

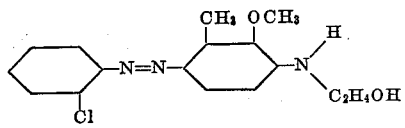

Example 2

1 mole of p-aminoacetophenone is diazotized as described in Example 1, and coupled with 1 mole of 2-ethoxy-3-ethyl-dimethylaniline dissolved in 1000 grams of cold acetic acid. The mixture is neutralized with soduim acetate using Congo red indicating paper. When the coupling reaction is complete, water is added to precipitate the dye, which is filtered off, washed and dried. Cellulose acetate is colored orange shades from an aqueous suspension of the dye.

The azo compound obtained has the formula:

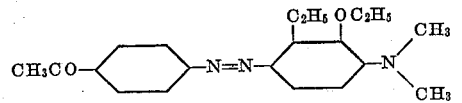

Example 3

1 mole of p-nitroaniline is suspended in 2000 c. cs. of water containing 300 c. cs. of hydrochloric acid and a small amount of ice, and the amine diazotized with 69 grams of sodium nitrite. The solution thus prepared is added with stirring to 1 mole of 2-β-methoxyethoxy-3-methyl-β-sodium sulfoethyl butylaniline dissolved in a minimum amount of a mixture of ice and water. Concurrently with the addition of the diazo solution, there is added a solution of sodium carbonate at a rate sufficient to maintain the reaction mixture practically neutral to Congo red indicator. When the coupling reaction is complete, the dye is precipitated with salt, filtered off and dried. Cellulose acetate is colored orange-red shades from an aqueous solution of the dye which may contain salt.

The azo compound obtained has the formula:

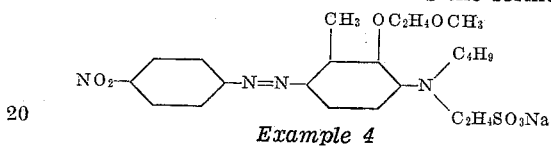

*Example 4*

1 mole of p-nitro-o-chloroaniline is diazotized and coupled with approximately 1 mole of 2-methoxy-3-propyl-β-methyl sodium phosphatoethyl pentyl aniline following the procedure described in Example 3. When the coupling reaction is complete, the dye is salted out, filtered off, washed and dried. Cellulose acetate is colored red shades from an aqueous solution of the dye.

The azo compound obtained has the formula:

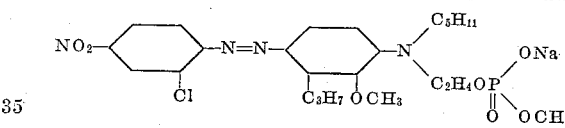

The invention is illustrated further by the following additional examples of suitable diazotization and coupling components, the dyes resulting therefrom coloring cellulose acetate fibers the shades of color designated.

such as $-CH_3$, $-C_2H_5$, $-C_4H_9$, $-C_{16}H_{33}$, $-OCH_3$, $-OC_2H_5$, $-OC_3H_7$, $-COOH$, $-COOCH_3$, $-COOC_4H_9$, and similar kind of groups.

In the application of the azo compounds of our invention to the coloration of organic derivatives of cellulose, the dye compound is ordinarily applied from an aqueous solution or suspension of the dye. If the particular azo dye compound is insoluble or only slightly soluble in water, a suspension is first prepared by grinding the dye to a paste in the presence of a dispersing agent such as a soap, a sulfonated oil, or a higher fatty acid glyceryl sulfate, and then dispersing the paste in a suitable quantity of water. The material to be colored is immersed in the dispersion starting with a bath temperature of approximately 45-55° C., which is then gradually increased to a maximum of 80-85° C., at which point it is maintained for several hours. Salt may be added to facilitate exhaustion of the dye bath during the dyeing operation. When the material has acquired the desired shade or condition of color, it is removed from the bath, washed with soap, rinsed and dried. On the other hand, if the particular dye compound is water-soluble, the dye may be applied to the material directly from an aqueous solution containing salt without the necessity of employing a dispersing or solubilizing agent.

While our invention is illustrated more particularly in connection with cellulose acetate, a material to which the invention is especially adapted, it will be understood that the azo dye compounds above described are by no means limited exclusively to cellulose acetate, but are likewise of value for coloring organic derivatives of cellulose in general, including both the hydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate, cellulose acetate-butyrate, and cellulose ethers such as methyl cellulose, ethyl cellulose, and benzyl cellulose.

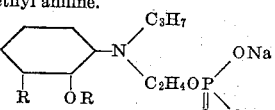

| Diazotization component | Coupling component | Shade on cellulose acetate |
|---|---|---|
| Ortho-, meta-, or parachloroaniline | (1) 2-methoxy-3-methyl-β-hydroxyethyl-aniline | Orange to yellow. |
| Do | (2) 2-methoxy-3-methyl-dimethylaniline | Do. |
| Do | (3) 2-methoxy-3-methyl-propyl sodium carboxymethyl aniline. | Do. |
| Do | (4) [structure wherein R stands for an alkyl group] | Do. |
| o-Nitroaniline | Couplers 1-4 | Orange. |
| m-Nitroaniline | do | Orange-yellow. |
| p-Nitroaniline | do | Orange-red. |
| p-Nitro-o-chloroaniline | do | Rubine. |
| p-Nitro-o-bromoaniline | do | Do. |
| p-Nitro-o-fluoroaniline | do | Do. |
| p-Nitro-o-alkoxyaniline | do | Red. |
| p-Nitro-o-carboxyaniline alkyl ester | do | Do. |
| p-Nitro-o-carboxyaniline | do | Do. |
| p-Nitro-o-alkylaniline | do | Orange. |
| o-Nitro-p-alkoxyaniline | do | Do. |
| o-Nitro-p-haloaniline | do | Do. |
| p-Aminoacetophenone | do | Do. |
| p-Amino-m-halo-acetophenone | do | Do. |
| p-Amino-m-nitro-acetophenone | do | Rubine. |
| 2,4-dinitroaniline | do | Purple. |
| 2,4-dinitro-6-haloaniline | do | Violet. |
| 1-amino-2,6-dinitro-4-phenyl-methyl ketone | do | Do. |
| 2,4-dinitro-6-carboxyaniline | do | Do. |
| 2,4-dinitro-6-carboxyaniline alkyl ester | do | Do. |
| 4-nitro-α-naphthylamine | do | Rubine. |
| 2,4-dinitro-α-naphthylamine | do | Violet. |
| 2,4,6-trinitroaniline | do | Do. |
| p-Aminoazobenzene | do | Red. |

The expressions "halo," "alkyl," "alkoxy," and "carboxy" are intended to mean wherever used in the specification and claims, unless otherwise specified, atoms such as Cl, Br, F, and radicals

We claim:

1. The non-sulfonated nuclear azo compounds having the general formula:

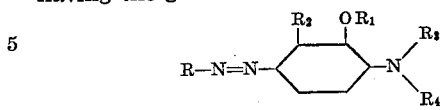

wherein R represents a member selected from the group consisting of a benzene nucleus, and a naphthalene nucleus, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group.

2. The non-sulfonated nuclear azo compounds having the general formula:

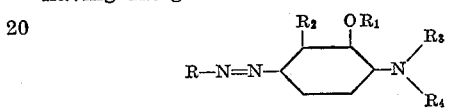

wherein R represents a benzene nucleus, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group.

3. The non-sulfonated nuclear azo compounds having the general formula:

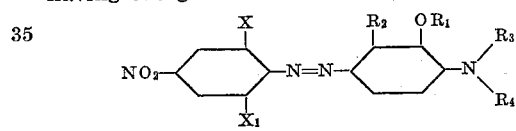

wherein X and $X_1$ each represents a member selected from the group consisting of hydrogen, a halogen, a hydroxy group, and a nitro group, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group.

4. The non-sulfonated nuclear azo compound having the general formula:

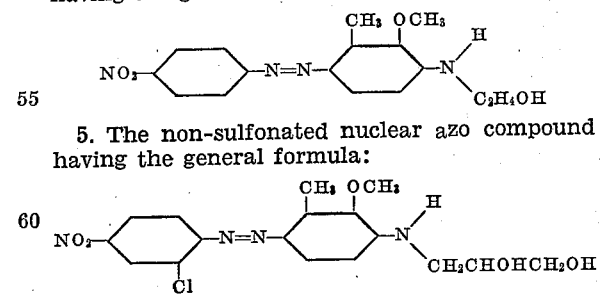

5. The non-sulfonated nuclear azo compound having the general formula:

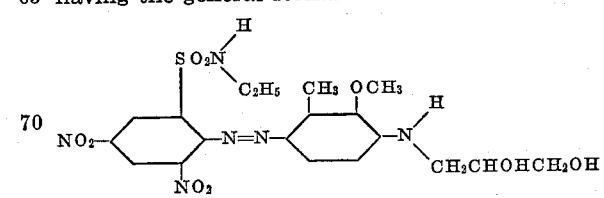

6. The non-sulfonated nuclear azo compound having the general formula:

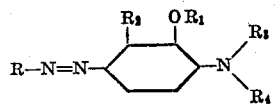

7. Material made of or containing an organic derivative of cellulose colored with a dye selected from the class of non-sulfonated nuclear azo compounds having the general formula:

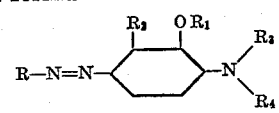

wherein R represents a member selected from the group consisting of a benzene nucleus, and a naphthalene nucleus, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group.

8. Material made of or containing cellulose acetate colored with a dye selected from the class of non-sulfonated nuclear azo compounds having the general formula:

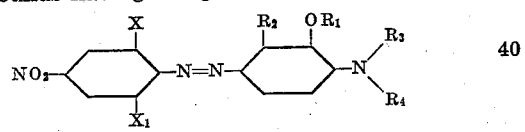

wherein R represents a member selected from the group consisting of a benzene nucleus, and a naphthalene nucleus, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group.

9. Material made of or containing an organic derivative of cellulose colored with a dye selected from the class of non-sulfonated nuclear azo compounds having the general formula:

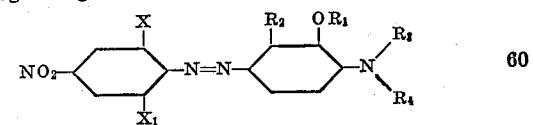

wherein X and $X_1$ each represents a member selected from the group consisting of hydrogen, a halogen, a hydroxy group, and a nitro group, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group.

10. Material made of or containing cellulose acetate colored with a dye selected from the class of non-sulfonated nuclear azo compounds having the general formula:

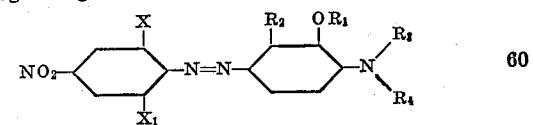

wherein X and $X_1$ each represents a member selected from the group consisting of hydrogen, a halogen, a hydroxy group, and a nitro group, $R_1$ and $R_2$ each represents an alkyl group, $R_3$ represents a member selected from the group consisting of hydrogen, and an alkyl group, and $R_4$ represents a member selected from the group consisting of an alkyl group, a hydroxyalkyl group, a sulfoalkyl group, a phosphatoalkyl group, and a carboxyalkyl group.

JAMES G. McNALLY.
JOSEPH B. DICKEY.